(12) United States Patent
Christoffersson et al.

(10) Patent No.: US 9,092,319 B2
(45) Date of Patent: Jul. 28, 2015

(54) STATE MEMORY MANAGEMENT, WHEREIN STATE MEMORY IS MANAGED BY DIVIDING STATE MEMORY INTO PORTIONS EACH PORTION ASSIGNED FOR STORING STATE INFORMATION ASSOCIATED WITH A SPECIFIC MESSAGE CLASS

(71) Applicant: TELEFONAKTIEBOLAGET L M ERICSSON (PUBL), Stockholm (SE)

(72) Inventors: Jan Christoffersson, Luleå (SE); Hans Hannu, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 98 days.

(21) Appl. No.: 14/090,775

(22) Filed: Nov. 26, 2013

(65) Prior Publication Data
US 2014/0082320 A1    Mar. 20, 2014

Related U.S. Application Data

(63) Continuation of application No. 10/598,152, filed as application No. PCT/SE2004/001084 on Jul. 2, 2004, now abandoned.

(60) Provisional application No. 60/545,470, filed on Feb. 19, 2004.

(51) Int. Cl.
G06F 13/00 (2006.01)
G06F 15/16 (2006.01)
(Continued)

(52) U.S. Cl.
CPC .......... *G06F 12/023* (2013.01); *H04L 47/2433* (2013.01); *H04L 67/14* (2013.01); *H04L 67/141* (2013.01); *H04L 67/142* (2013.01); *H04L 69/04* (2013.01); *H04L 2012/5651* (2013.01)

(58) Field of Classification Search
CPC ... G06F 12/023; H04L 67/141; H04L 67/142; H04L 67/14; H04L 69/04; H04L 47/2433; H04L 2012/5651
USPC .................. 709/206, 213, 214, 217; 711/173
See application file for complete search history.

(56) References Cited

U.S. PATENT DOCUMENTS 5,402,115 A    3/1995  Tanaka
5,671,436 A    9/1997  Morris et al.
(Continued)

FOREIGN PATENT DOCUMENTS

JP    H07-129492 A    5/1995
JP    2003-018240 A   1/2003
(Continued)

OTHER PUBLICATIONS

Surtees, et al: "Implementer's Guide for SigComp". Nov. 22, 2003.
(Continued)

*Primary Examiner* — Daniel C Murray

(57) ABSTRACT

The present invention relates to management of a state memory in a communications unit. The state memory then stores states that are used in message-based communication with external units in a communications system. The data message communicated between the units are defined into multiple message classes. Furthermore, the state memory is divided into multiple memory portions, where each such memory portion is assigned to store states associated with a specific message class. This will prevent overwriting important states with less useful states.

24 Claims, 8 Drawing Sheets

(51) Int. Cl.
*G06F 15/167* (2006.01)
*G06F 12/02* (2006.01)
*H04L 12/851* (2013.01)
*H04L 29/08* (2006.01)
*H04L 29/06* (2006.01)
*H04L 12/70* (2013.01)

(56) References Cited

U.S. PATENT DOCUMENTS

| | | | |
|---|---|---|---|
| 5,717,842 | A | 2/1998 | Ambalavanar et al. |
| 5,721,858 | A | 2/1998 | White et al. |
| 5,828,835 | A * | 10/1998 | Isfeld et al. .................. 709/200 |
| 5,950,231 | A | 9/1999 | Nichol |
| 6,058,424 | A | 5/2000 | Dixon et al. |
| 6,119,176 | A | 9/2000 | Maruyama |
| 6,144,669 | A | 11/2000 | Williams et al. |
| 6,243,830 | B1 | 6/2001 | Nakatsugawa |
| 6,577,769 | B1 | 6/2003 | Kenyon et al. |
| 6,766,147 | B2 | 7/2004 | O'Hare et al. |
| 7,000,087 | B2 | 2/2006 | Atherton et al. |
| 7,024,463 | B1 | 4/2006 | Hitomi et al. |
| 7,353,266 | B2 | 4/2008 | Bracewell et al. |
| 7,447,802 | B2 | 11/2008 | Silky et al. |
| 7,657,253 | B2 | 2/2010 | Lewis |
| 2002/0080789 | A1 | 6/2002 | Henderson et al. |
| 2002/0103902 | A1 | 8/2002 | Nagel et al. |
| 2002/0104097 | A1 | 8/2002 | Jerding et al. |
| 2002/0132613 | A1 | 9/2002 | Leung et al. |
| 2003/0030575 | A1 | 2/2003 | Frachtenberg et al. |
| 2003/0212855 | A1 | 11/2003 | Sakaguchi et al. |
| 2004/0162889 | A1 | 8/2004 | Morris et al. |
| 2006/0085541 | A1 | 4/2006 | Cuomo et al. |
| 2006/0136593 | A1 | 6/2006 | Silky et al. |
| 2010/0067519 | A1 | 3/2010 | Mang et al. |
| 2010/0142700 | A1 | 6/2010 | Lee et al. |

FOREIGN PATENT DOCUMENTS

| | | |
|---|---|---|
| WO | WO 97/01255 | 1/1997 |
| WO | WO 2004/088850 | 10/2004 |

OTHER PUBLICATIONS

Deutsch, et al. "DEFLATE Compressed Data Format Specification version 1.3" RFC 1951, Internet Engineering Task Force, May 1996.
Hannu, et al. "Signaling Compression (SigComp)—Extended Operations". RFC3321, Internet Engineering Task Force, Dec. 2002.
Price, et al.: "Signaling Compression (SigComp)", Network Working Group, RFC 3320.
Rosenberg, et al: "SIP: Session Initiation Protocol". RFC3261, Internet Engineering Task Force, Jun. 2002.
Storer, et al.: "Data Compression via Textual Substitutions", Journal of the ACM 29, 1982.

* cited by examiner

US 9,092,319 B2

STATE MEMORY MANAGEMENT, WHEREIN STATE MEMORY IS MANAGED BY DIVIDING STATE MEMORY INTO PORTIONS EACH PORTION ASSIGNED FOR STORING STATE INFORMATION ASSOCIATED WITH A SPECIFIC MESSAGE CLASS

CLAIM OF PRIORITY

This application is a continuation application of U.S. patent application Ser. No. 10/598,152, filed Aug. 18, 2006, now abandoned, which is a 371 of PCT/SE04/01084 filed on Jul. 2, 2004, which claims the benefit of U.S. Provisional Application Ser. No. 60/545,470 filed on Feb. 19, 2004. The contents of these documents are hereby incorporated by reference herein.

TECHNICAL FIELD

The present invention generally relates to memory management in communications systems, and in particular to management of state memories in such systems.

BACKGROUND

Today there is an increasing trend of data communication between communications units in different communications systems. Typical examples are communication between computers connected over a communications system such as Internet or a local area network and data communication between mobile user equipment and a communications server or node or another mobile user equipment over a radio communications system.

Many application protocols used in the data communication require that certain information and data is included in the messages transmitted over the communications system. This data could be required for enabling efficient session set-up, efficient delivery of the data messages throughout the system and/or could be used by the receiving communications unit for interpreting and processing the received messages. As a consequence many of the communicated data messages include fields that always comprise more or less the same data for a given pair or combination of communications units. This is generally no problem in communications systems with bandwidth rich communications links. However, in radio communications systems and other systems with typically a limited amount of available communications resources there is a general desire to reduce the amount of data that has to be transmitted between communications units.

As a consequence, a state-mediated data communication can be conducted. In such a case, the relevant states include information that may be used by the communications units in initiating the communications session and/or later on during the session. Thus, by employing states for the inter-unit communication several advantages can be obtained. Firstly, the duration of the very often time-critical communication session set-up can be reduced if the communications units already have access to states that include data required for such set-up procedures. In other words, this required set-up-related data does not have to be communicated between the units before or during the set-up, which results in reduced signaling and reduced set-up times. Furthermore, states can be used also during the subsequent signaling, for example by reducing the amount of data that has to be transmitted between the units and/or during compression and decompression procedures for further reducing the resulting size of the communicated (compressed) data messages.

The states are typically stored in a general-purpose memory or more often in a dedicated state memory in the communications unit. However, the size of the state memory or the state-associated storage portion of the general-purpose memory is often limited. The states in the memory are further often managed in a first-in-first-out (FIFO) basis. This means that when a new state is to be stored in the memory, it overwrites the oldest state found therein or the oldest state is shifted out of the memory, in cases where the memory is filled. This can, though, result in major problems for the inter-unit signaling if not the "right" states are found in the memory. For example, during a session set-up procedure the memory can be filled with presence update states, which will be useless for the session set-up. As a consequence, an inefficient and long set-up will occur, which will ruin the user-perceived interactivity.

SUMMARY

The present invention overcomes these and other drawbacks of the prior art arrangements.

It is a general object of the present invention to provide a management of a state memory storing states utilized in message-based communication. It is another object of the invention to provide a state memory management that organizes states into different memory compartments based on state priority information and/or message types.

Yet another object of the invention is to provide a state memory management that prevents replacing important states with less useful states.

These and other objects are met by the invention as defined by the accompanying patent claims.

Briefly, the present invention involves management of a state memory that is adapted for storing states employed in a message-based communication between communications units in a communications system. According to the invention, multiple message classes are defined of the messages communicated between the units. In addition, the state memory of a communications unit is divided into multiple memory portions. Each such memory portion is then assigned for storing only states associated with a given message class.

The classification of messages could result in two message classes, a first high priority class and a low priority class. Correspondingly, the memory can then be divided into two memory portions, where the first stores states generated based on messages of the high priority class and the second portion includes states generated based on low priority messages. Thus, those states that are very useful for the communications unit during e.g. session set-up, message processing and/or message transmission are separated from less useful states to prevent overwriting or replacing an important state with a less useful state in state memory limited situations. As a consequence, the probability that the communications unit will have access to a state that can be used for reducing the session set-up time and/or enhancing compression or message processing performance increases dramatically by introducing this state memory division and message classification.

The sizes of the different memory portions may be equal or different. The latter case may be advantageous if states associated with a given message class generally are larger than other states. In addition, it may be advantageous to provide a larger storage space for memory portion(s) storing important states than for other state memory portions.

Once the communications unit provides a data message, e.g. from an application in the unit or received from an external unit, it determines the message class of the message. This is preferably performed based on data found in the message itself, e.g. by parsing a line in the message and identifying the message name.

Thereafter it may be optionally determined whether a state should be generated based on the message and stored in the correct memory portion. This can be elucidated by retrieving storage priority information from a look-up list. Such look-up list can then state which states that should be stored and/or which states that should not be stored in the state memory. Alternatively, an investigation of the states already stored in the memory portion can be performed to determine whether to store the new state. For example, if a similar state already is found in the memory portion it may be unnecessary to store the new state. In cases where the unit has access to a compressor and the states are used for enhancing the compression rate, a compression factor can be used a state storage distinguishing factor. Thus, if the message, based on which the new state is generated, can be compressed efficiently by the compressor, this implies that the memory portion includes a state that is very similar to the new state. If this is the case, then there is no need to store the new state generated based on the message.

Once it has been determined that the state should be stored, it is generated from the message. In a particular embodiment, the state includes the message or at least a portion thereof. The correct memory portion is then identified, preferably based on the message class of the message. The state is then stored therein.

The invention offers the following advantages:
Provides an organization of states in a state memory that will prevent overwriting important states with less useful states;
Enables a reduction in session set-up times by preventing replacing set-up associated states with other types of states; and
Increases the compression performance in state memory limited situations.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which.

DETAILED DESCRIPTION

Figure 1:
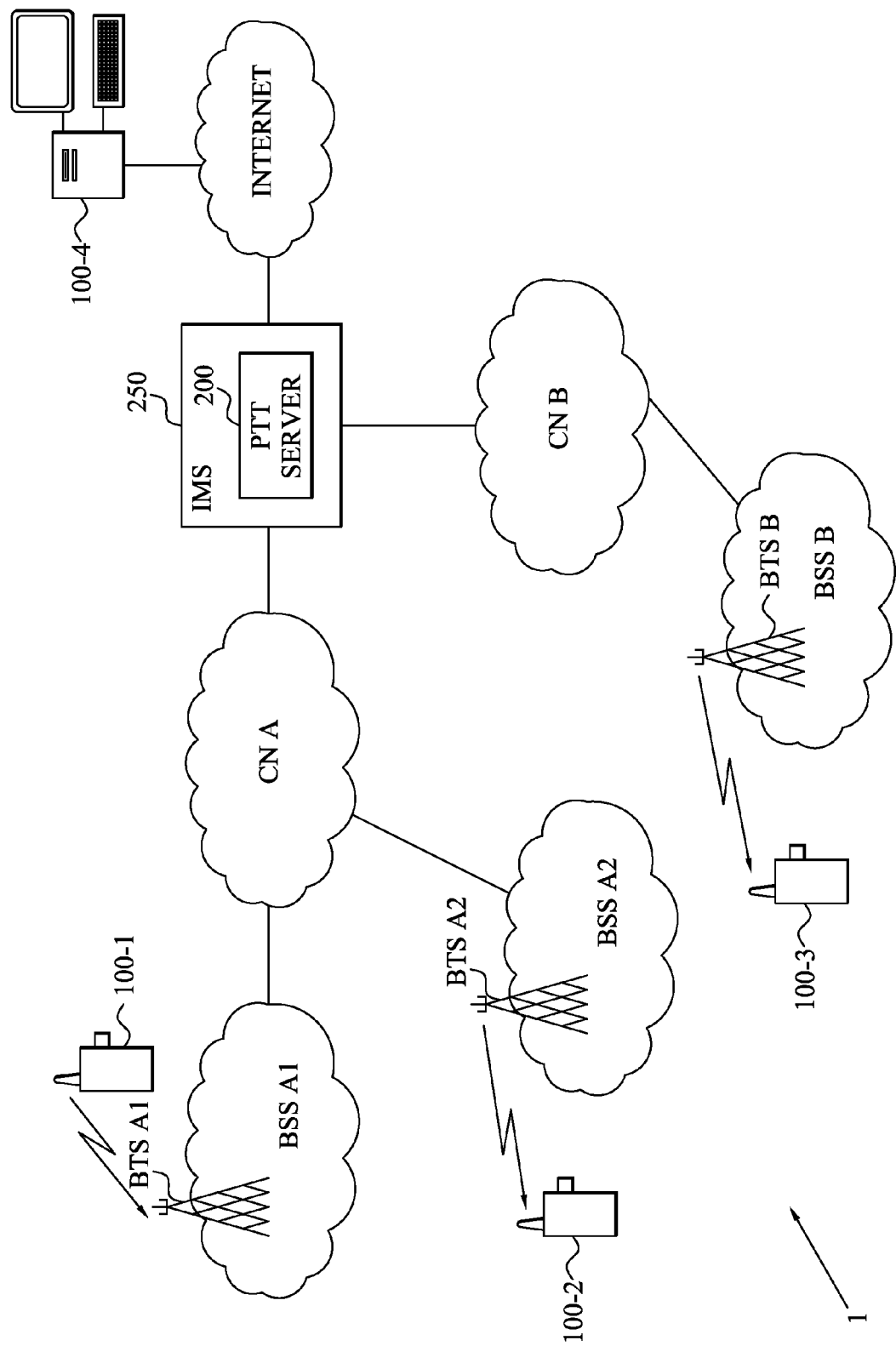
FIG. 1 is a schematic overview of a communications system according to the present invention exemplified as a radio communications system offering Push to Talk (PTT) services to connected user communications units.

Throughout the drawings, the same reference characters will be used for corresponding or similar elements.

The present invention relates to management of a state memory adapted for storing state information used in a message-based communication between communications units in a communications system. According to the present invention, the data messages communicated between the units are defined or divided into multiple, i.e. at least two, message classes. Furthermore, the state memory is divided into multiple ($\geq 2$) memory portions. A memory portion is then assigned or dedicated for storing state information associated with a given message class. This will allow a communications unit to have access to important state information during communication with other communications units even in cases where several, not especially important, states are stored in other portions of the state memory.

In the following the present invention will be described and disclosed with reference to a radio communications system providing communications services to connected mobile units. However, the present invention is not limited thereto but can be applied to other communications system, in which units conduct message-based data communication. A typical example could be a computer communicating with another computer or server in a local area network or over Internet. Typical examples of radio communications systems to which the teachings of the invention can be applied include Global System for Mobile communications (GSM), General Packet Radio Service (GPRS), Enhanced GPRS (EGPRS), Enhanced Data rates for GSM Evolution (EDGE) based systems, Universal Mobile Telecommunications System (UMTS) and different Code Division Multiple Access (CDMA) communications systems.

FIG. 1 illustrates an example of a radio communications system exemplified as a cellular communications system 1 providing push-to-talk (PTT) services to connected communications units 100-1 to 100-4.

In addition to the typical network architecture with a radio access network comprising a number of base station systems BSS A1, BSS A2; BSS B with base transceiver stations or node B BTS A1, BTS A2; BTS B and core network CN A; CN B, the radio communications system 1 comprises an IP-multimedia sub-system (IMS) 250 with a PTT server 200. This PTT server 200 typically handles call set-up signaling for PTT calls and the flow control of PTT traffic. Furthermore, real-time routing of IP (Internet Protocol) packets carrying the speech data to the correct receiving user equipment 100-2; 100-3; 100-4 is managed by the PTT server 200.

In the figure, four PTT supporting user handsets or equipment 100-1 to 100-4 are illustrated. The user equipment 100-1 to 100-4 comprises a PTT client implemented therein and is equipped with a PTT hardware or software button used for performing push to talk conversation. The users (owners) of the equipment 100-1 to 100-4 typically have a service agreement, e.g. subscription, with the PTT service provider (often the network operator). The user equipment 100-1 to 100-3 can be a (conventional) mobile unit or telephone configured with a PTT client. Also a computer or laptop 100-4 connected to the PTT server 200 over e.g. Internet is possible.

In a PTT session, a first user wants to communicate with one (one-to-one communication) or several (one-to-many) other users through PTT communication. The user typically selects the friend(s) to communicate with from an address book or PTT book in his communications unit 100-1. This address book preferably also informs, i.e. provides presence information, the user, which of his friends that presently are connected to the communications system 1 and therefore are able to participate in a PTT session. The user then presses a PTT button on his unit 100-1. This PTT button could be a hardware button or implemented in software in the unit 100-1. When the button is pressed a session setup signaling is started. When this initial setup is finished the user can start to talk with his friend(s), i.e. a talk burst starts. When the user releases the button, or presses a PTT stop button, the talk burst ends. During the talk burst, i.e. during the speech, the talk (speech) is sampled, speech coded and packed into a number or data packets, typically Adaptive Multi Rate (AMR) packets or frames, as is known in the art. Before transmission to the friends' communications unit 100-2 to 100-4 over the radio communications system 1, the AMR packets or frames are packed into IP packets. The actual number of AMR packets per IP packet typically depends on the acceptable level of overhead, the used IP version and/or on header compression. Furthermore, Real-time Transport Protocol (RTP) is preferably used in the GPRS access and core network. The transmitted IP packets are then transmitted from the user equipment 100-1 through base station BS A1, base station system BSS A1 and core network CN A to the PTT server 200. The server then routs the packets to the intended communications units 100-2 to 100-4.

Although the PTT server 200 has been illustrated as one communications endpoint in the figure with a user equipment 100-1 as the other endpoint, a dedicated communications functionality, a Proxy-Call Session Control Function (P-CSCF), is typically arranged in the IMS server 250 for receiving and transmitting messages on behalf of the PTT server 200 and other IMS service nodes. The two communicating endpoints could then be regarded as this P-CSCF and the user equipment.

In PTT services and other IMS services, including other Voice over IP (VoIP) services, the communications units communicate using Session Initiated Protocol (SIP), Session Description Protocol (SDP), Real Time Streaming Protocol (RTSP) and other application protocol messages. Such messages typically comprise data fields that are (always) populated with the same data. This means that multiple messages transmitted from a first communications unit and intended to a second communications unit comprise a first portion of data, typically provided in the message header, that is common for the messages and a second data portion, typically payload portion and some of the data in the header, that differs between the messages. Such common data could be included in a state that is provided to the communications units. This state can then be used in the subsequent message signaling in order to reduce the amount of data that has to be transmitted between the units and/or for reducing the session set-up times. In addition, if message compression is used for further reducing the size of the data messages, states can be used to enhance the message performance and, thus, allows a more efficient message signaling in the communications system.

In other words, a state according to the invention can include the common communications unit- or user-associated data used in the communications unit for efficient processing and/or interpretation of the data messages. Take SIP as an example. Capabilities and settings of the SIP-enabled communications unit are communicated during session initiation, and tend not to change unless the capabilities of the device change. In addition, application protocol related data used in the message processing may be re-used between different messages generated using that protocol. In such a case, states can include such protocol-related data. Similarly, user-specific information such as the user's Uniform Resource Locator (URL), name, and e-mail address, etc. will likely not change on a frequent basis and will appear regularly in SIP signaling involving a specific user. Such information may then be provided and stored as one or more states. As was discussed above, a state can also include information used in message compression and/or decompression. Thus, a state can include any data useful in message processing, including byte code and instructions for different message processors, and even a data message or a portion thereof.

It should further be emphasized that the present invention is not limited to communications systems providing PTT or other VoIP services, but can be applied to a communications system providing any message-based communications service where states can be used in connection with such message communication.

Figure 2:
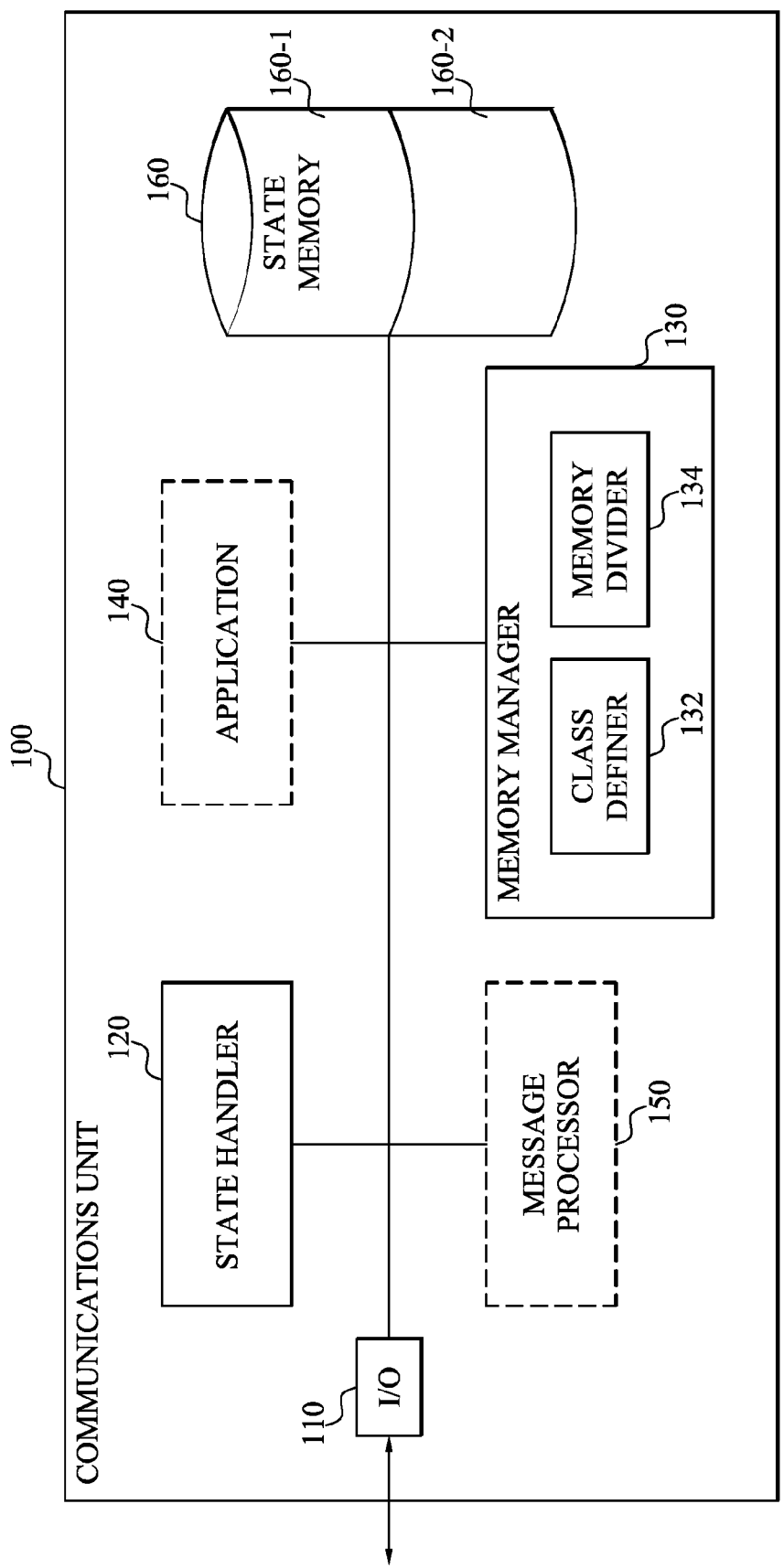
FIG. 2 is a schematic block diagram of an embodiment of a communications unit according to the present invention.

FIG. 2 illustrates a schematic block diagram of an embodiment of a communications unit 100 according to the present invention. This unit 100 could be user equipment, such as a mobile unit, mobile telephone, Personal Digital Assistant (PDA) or a computer. Furthermore, a SIP, SDP, RTSP or another application protocol server could be a communications unit 100 according to the invention. Further non-limiting examples of communications units 100 are a PTT servers and other IMS servers, the P-CSCF, for example provided in a server or in a network node in a communications system.

The communications unit 100 generally comprises an input and output (I/O) unit 110 for conducting communications with external units in a communications system. This I/O unit 110 is in particular adapted for transmitting and receiving data messages to and from, respectively, an external unit. The I/O unit 110 can further transmit and receive state copies to and from, respectively, the external unit as is further discussed in the international patent application [1].

The communications unit 100 also comprises an (optional) application 140 that schematically represents a functionality in the unit 100 that generates messages to be communicated to external units. For the example with a PTT-enabled communications unit 100, the application could manage speech sampling, speech coding and packing into a number of data packets, which are, in turn, grouped into data messages. Correspondingly, when the communications unit 100 receives a message comprising PTT data, the application 150 could be adapted for unpacking the data therein and re-create the speech that is replayed for the user of the unit 100.

A state handler 120 is provided in the communications unit 100 for managing states. The state handler 120 is preferably configured for generating states to be used in the message-based communication with external units. Alternatively, the states could be generated elsewhere in the unit 100, e.g. in the application 140. Once the state handler 120, or some other means in the unit 100, has generated the state, the state handler 120 stores it in an associated state memory 160 provided in the unit 100, which is discussed in more detail below. Alternatively, the state memory 160 could be provided elsewhere as long as the communications unit 100 has access to the data therein. For further information of a state handler reference is made to the documents [1-3].

A message processor 150 may be arranged in the communication unit 100 for processing data messages based on state information. For example, when the application 140 has generated a data message it provides the original message to the processor 150. The processor 150 then includes functionality for removing the data that is found in a stored state from the message, typically from the header portion of the message. The size of this processed message is then smaller than the corresponding size of the original message. The reduced-size message can then be forwarded to the I/O unit 110 for transmission to an external unit.

Correspondingly, when the I/O unit 110 receives a reduced-size message from an external unit, the processor 150 may, possibly through operation of the state handler 120, retrieve data from a state in the state memory 160 and add this data to the reduced-size message to get the original-version message. The message is then forwarded to the application 140 that now, due to adding the missing data, can successfully interpret and process the message.

The communications unit 100 further includes a memory manager 130 adapted for managing the associated state memory 160. This manager 130 includes a message class definer 132 that is provided for defining at least two message classes of the messages communicated between the unit 100 and external units in the communications system. In a first embodiment of the invention two classes are defined, a first important or high priority class that comprises data messages, the associated states of which are important e.g. for an efficient message signaling and/or set-up performance. A second class then includes less important or low priority messages. This basic idea can be further developed with more than two classes, e.g. a first high priority class, a second medium priority class and a third low priority class. As the person skilled in the art understands, this message definition can result in any number of different message classes larger than one.

Alternatively, or in addition, the class definer 132 can be implemented for defining message classes based on the application protocol(s) used in the generation of the message. Correspondingly, the messages can be classified in different classes based on a respective session type. For example, messages used during session set-up are classified into a first class, presence related messages in a second class, etc.

The definer 132 can use a fixed message classification that is employed through operation of the unit 100 and the definer 132. This same class definition can be used by all communications unit 100 in the system. Alternatively, different definitions can be used by different units 100. For example, the definer of a first communication unit defines a high and low priority message class, whereas a second definer in another unit uses a corresponding high, medium and low priority class. Messages classified into the medium class by the second definer could then be classified into the high or low priority class by the first class definer. Furthermore, the classification definition used by the definer 132 can change over time, e.g. at response to a class definition change command from an external unit in the communications system, e.g. received from the network operator associated with the communications unit 100.

The memory manager 130 also includes a memory divider 134 that is adapted for dividing the associated state memory 160 into at least two memory portions 160-1, 160-2. Each such memory portion 160-1, 160-2 is then assigned to store states associated with a specific memory class. For example, a first memory portion 160-1 can store high priority states, i.e. states generated based on high priority data messages, whereas a second memory portion 160-2 stores low priority states. The memory divider 134 preferably bases the state memory division on the message class definition used by the definer 132. In such a case, there can be a one-to-one relation between the message classes and the memory portions 160-1, 160-2. In other words, the number of memory portions 160-1, 160-2 equals the number of different message classes, so that each message class will be associated with a unique memory portion 160-1, 160-2. Alternatively, the number of memory portions 160-1, 160-2 and memory classes may differ. For example, the class definer 132 can be configured for defining three different message classes whereas the memory divider 134 divides the state memory 160 into only two memory portions 160-1, 160-2. In such a case, the first memory portion 160-1 could store states associated with messages of the first class and the second memory portion 160-2 is provided for storing states generated based on messages of both the second and third message class. Alternatively, the second memory portion 160-2 only stores states obtained from messages of the second message class, whereas no third message class associated states will be stored in the memory 160.

This state memory dividing guarantees that important states that are required for efficient session set-up and/or high compression and signaling performance are not overwritten by less important states. Also, by providing a memory portion 160-1, 160-2 for each message class or type, the chances of always having access to at least one state for a given message type greatly increases by employing the present invention.

The memory divider 134 can allocate equal amount of storage area or space for the different memory portions 160-1, 160-2. However, in some situations it might be preferred to allocate different amount of storage areas to different memory portions 160-1, 160-2. For example, the states associated with a given message class could, on average, by larger than the corresponding (average) state size for other message classes. In such situations it may be beneficial to allocate different storage area sizes. Another example could be to allocate more storage area to high priority states compared to low priority states.

The memory 160 may be implemented in the communication unit 100 or otherwise associated thereto. The memory could be a dedicated state memory 160 or constitute an assigned portion of a general-purpose storage area that also could include other data. In several applications, in particular when arranged in a mobile unit or other thin client, the total storage area of the memory 160 is constrained. In these situations it becomes vitally important that the "right" states are found in the state memory 160. This can then be obtained by the memory division according to the invention. Each memory portion can then preferably store at least one, and sometimes preferably at least two states associated with a given memory class.

As was mentioned above, the state storing is preferably managed according to the first in first out (FIFO) principle. This means that the oldest state will be shifted out of the memory portion 160-1, 160-2 or overwritten when a new state is to be entered the memory portion 160-1, 160-2 (and the portion is currently full or near full). A possible implementation of a memory portion 160-1, 160-2 is then as a circular buffer or storage area.

The units 110 to 150 of the communications unit 100 may be provided as software, hardware or a combination thereof. The units 110 to 160 may be implemented together in the communications unit 100. Alternatively, in particular for a server-implemented embodiment of a communications unit 100 in a communications system, a distributed implementation is also possible with some of the units provided in different network nodes.

Figure 3:
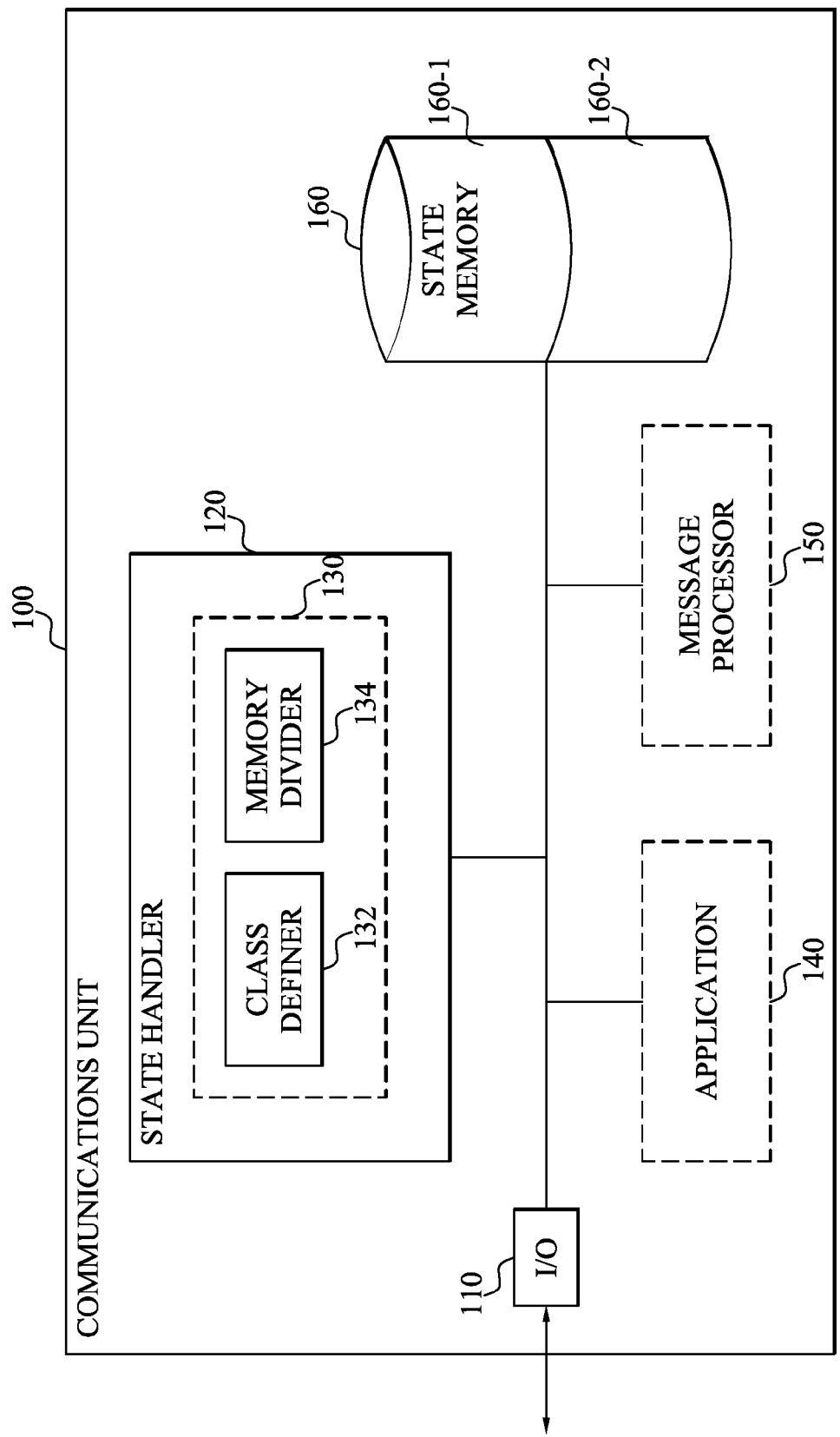
FIG. 3 is a schematic block diagram of another embodiment of a communications unit according to the present invention.

FIG. 3 illustrates a block diagram of another embodiment of the communications unit 100 according to the present invention. The I/O unit 110, application 140, message processor 150 and state memory 160 are similar to the corresponding units described above in connection with FIG. 2 and are not further discussed. In this embodiment, the class definer 132 and the memory divider 134 are implemented in the state handler 120. As a consequence, the functionalities and units employed for state generation and managing are grouped together and provided by the state handler 120. The operation of the state handler 120, class definer 132 and memory divider 134 in this embodiment correspond to what is described in connection with FIG. 2.

The units 110 to 150 of the communications unit 100 may be provided as software, hardware or a combination thereof. The units 110 to 160 may be implemented together in the communications unit 100. Alternatively, in particular for a server-implemented embodiment of a communications unit 100 in a communications system, a distributed implementation is also possible with some of the units provided in different network nodes.

The teachings of the present invention could also be applied to compressed message-based communication between communications unit. The data in the generated state could then also, or alternatively, be used during compression and/or decompression of data messages. In such a case, the state preferably enhances the message compression by enabling a reduction of the message size after compression compared to messages compressed without usage of the states.

Figure 4:
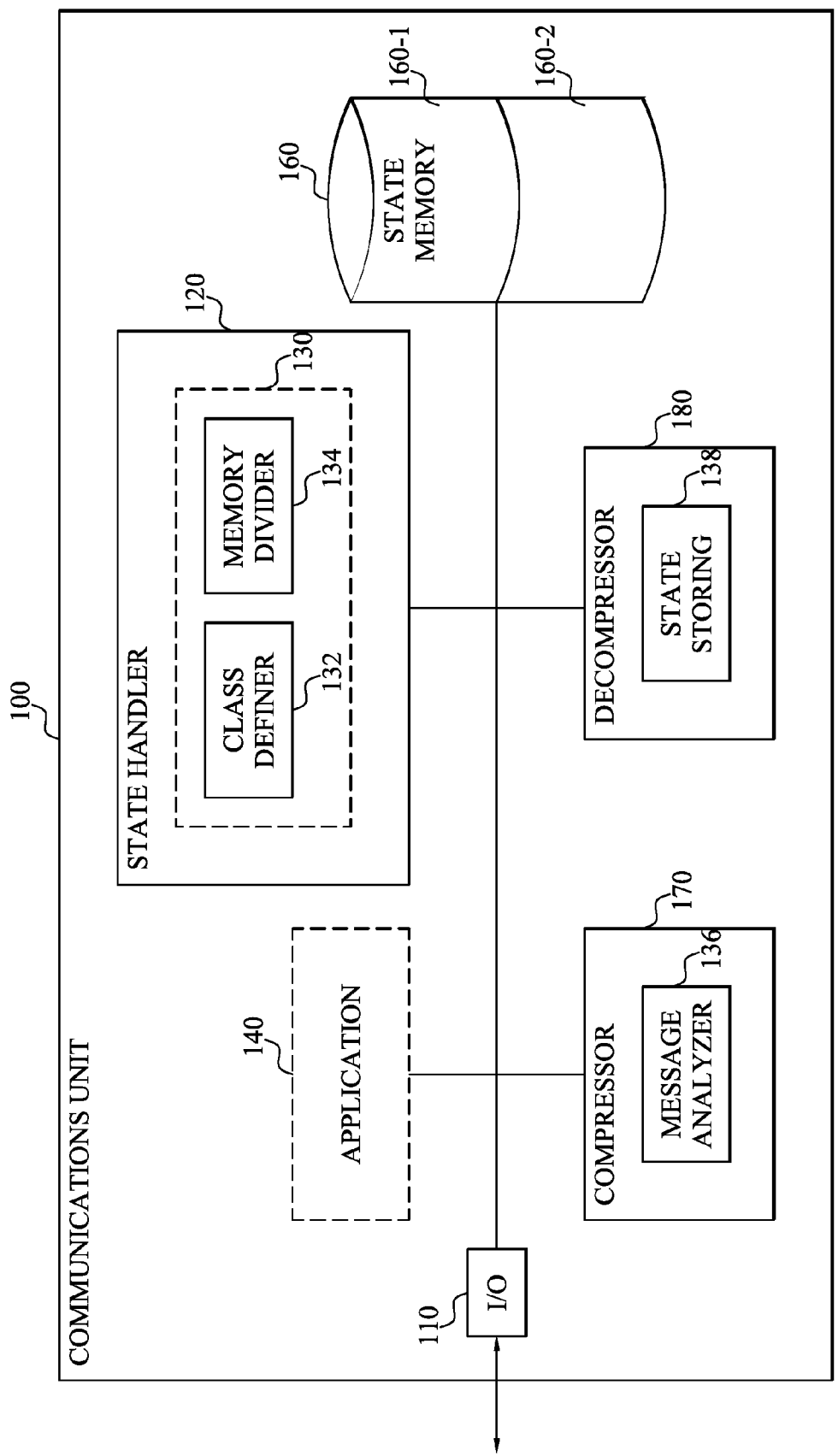
FIG. 4 is a schematic block diagram of yet another embodiment of a communications unit according to the present invention.

FIG. 4 illustrates a communications unit 100 that includes a message compressor 170 and decompressor 180. The I/O unit 110, state handler 120, application and state memory 160 are similar to the corresponding units described above in connection with FIGS. 2 and 3 and are not further discussed.

The compressor 170 in the communications unit 100 is adapted for compressing messages from an application 140 using a state stored in a state memory portion 160-1, 160-2 associated with the memory class of the given message. Data in the state also present in the message is then typically removed from the message during operation of the compressor 170. As a result the total size of the compressed message is reduced.

Binary compression algorithms, such as Deflate [4] and LZSS [5], use a state memory 160 referred to as dictionary, which comprises data (states) that are referenced in the compressed message. Basically, the foundation of such dictionary- or state-based compression is pattern matching and substitution, i.e. finding and replacing groups of consecutive symbols (strings) with an index to a dictionary. This results in compression if the representation of the index is shorter than the string it replaces. Thus, the teachings of the present invention can then be applied to such algorithms, where the associated dictionary is then divided into multiple sub-dictionaries or memory portions.

A typical example of the signal compression that uses a state-mediated compression and/or decompression is the Sig-Comp protocol that was recently developed and is further described in the documents [1-3]. SigComp is a compression solution for compressing data messages generated by application protocols such as SIP, Session Description Protocol (SDP) and the Real Time Streaming Protocol (RTSP) and offers a robust, lossless compression of such application messages. Since SigComp uses a state memory for storing states employed in the compression and decompression process, the present invention can used in connection with SigComp and other state-mediated compression and/or decompression solutions.

The decompressor 180 is provided in the unit 100 for decompressing a received compressed message from an external communications unit. The decompressor 180 is preferably configured for decompressing the message based on a state stored in the relevant state memory portion 160-1, 160-2. Data stored in the state, or at least a portion of this data, is typically entered or added to the message during operation of the decompressor 180.

When a data message is generated by the application 140 or received from an external unit by the I/O unit 110 (possibly after decompression by the decompressor 180) a state may be generated by the state handler 120 based on this message. The state is then preferably generated based on data found in the message. Alternatively, the state can include the whole or at least a portion of the message.

A message analyzer 136, implemented in the compressor 170 in FIG. 4 but can likewise be arranged in the state handler 120 or the communications unit 100, analyzes the message for determining to which message class it belongs. The analyzer 136 preferably performs this investigation based on data found in the message. For example, the message analyzer could be configured for parsing through the data message to identify key words or symbols allowing an identification of the relevant message class. In most application, it is sufficient to parse the first line in the message. The analyzer 136 can then in this line read the message name, e.g. Invite, 100 Trying, 202 Accepted, Subscribe, Publish, Notify, SIP 200 OK, and use this name information to determine to which class the message belongs. The analyzer 136 preferably receives the current message class definition from the definer 132 unless it already has access to the definition.

The message analyzer 136 can then generate a state generation command that causes the state handler 120 to generate a state from the message. In cases where the state includes the whole content of the message no such command and state generation is required. Furthermore, a state store command or signal specifying the message class of the message, which formed the basis for the state, is generated. Alternatively, this state store command can include an identifier of the relevant state memory portion 160-1, 160-2, in which the state should be stored. A state storing unit 138 is provided in the communications unit 100 and is responsive to the store command. This storing unit 138 identifies the correct memory portion 160-1, 160-2 based on the data in the command (message class identifier and/or memory portion identifier) and stores the state in this portion 160-1, 160-2 of the state memory 160. The storing unit 138 may then issue a state free instruction for the state to be overwritten in order to reclaim memory and make room for the new state to be saved.

The message analyzer 136 could be configured for always generating a storing command once a new message or state is provided. Alternatively, the analyzer investigates whether this particular state really should be stored in the memory 160.

In a first embodiment, the message analyzer 136 retrieves storage priority information from an associated look-up list, e.g. stored in the state memory 160 or provided in another data memory (not illustrated) in the communications unit 100 or associated thereto. Such look-up list can then state which states that should be stored and/or which states that should not be stored in the memory 160. For example, states generated based on certain message types are of little use for compression performance and signaling performance, including session set-up. In such a case, since the communications unit 100 will not use such states, they do not have to be stored in the memory 160 or even be generated if it comes to that. The list could also define that a state should be stored in some situations but not in other situations. For example, if the relevant state memory portion 160-1, 160-2 is not filled, the state could be stored, whereas if the portion 160-1, 160-2 is already filled with states, it will not be stored therein.

In an alternative embodiment, the analyzer 136 determines whether to store the state based on which states that are already stored in the relevant memory portion 160-1, 160-2, e.g. as determined by the state handler 120 or memory manager 130. For example, if a state generated based on an Invite message is already found in the memory portion 160-1, 160-2, a subsequent Invite-based state need not to be stored therein. Furthermore, time information can also be used in this determination process. If the already stored state is relatively old, it could contain data that no longer is especially relevant. In such a case, it will be beneficial to store the new state even if a state generated based on a message of the same message class already is found in the memory portion 160-1, 160-2. The time threshold value to use when determining if a state is deemed to be too old can be identical for all message classes and states. However, since the relevant data content in some message types, and thus a state generated based thereon, generally will change more frequently than for other message types, different time threshold values could be employed for different message classes and/or different memory portions 160-1, 160-2.

In yet another embodiment the decision whether to store a state is based on a compression factor. Thus, the state memory portion 160-1, 160-2 is not updated if the message (state) is too similar to what is already in this memory portion 160-1, 160-2. If the message can be compressed efficiently by the compressor 170 (high compression factor), this implies that the content in the memory portion 160-1, 160-2 is very similar to the message. If this is the case, then there is no need to store a state generated based on the message. However, if the compression factor is below some limit, the message is used to generate a state and update the relevant memory portion 160-1, 160-2.

As was briefly discussed above, the message analyzer 136 and/or the state storing unit 138 may, independently, be provided in the compressor 170, decompressor 180, memory manager 130, state handler 120 or elsewhere in the communications unit 100. Furthermore, the units 110 to 150, 170 and 180 of the communications unit 100 may be provided as software, hardware or a combination thereof. The units 110 to 180 may be implemented together in the communications unit 100. Alternatively, in particular for a server-implemented embodiment of a communications unit 100 in a communications system, a distributed implementation is also possible with some of the units provided in different network nodes.

Figure 5:
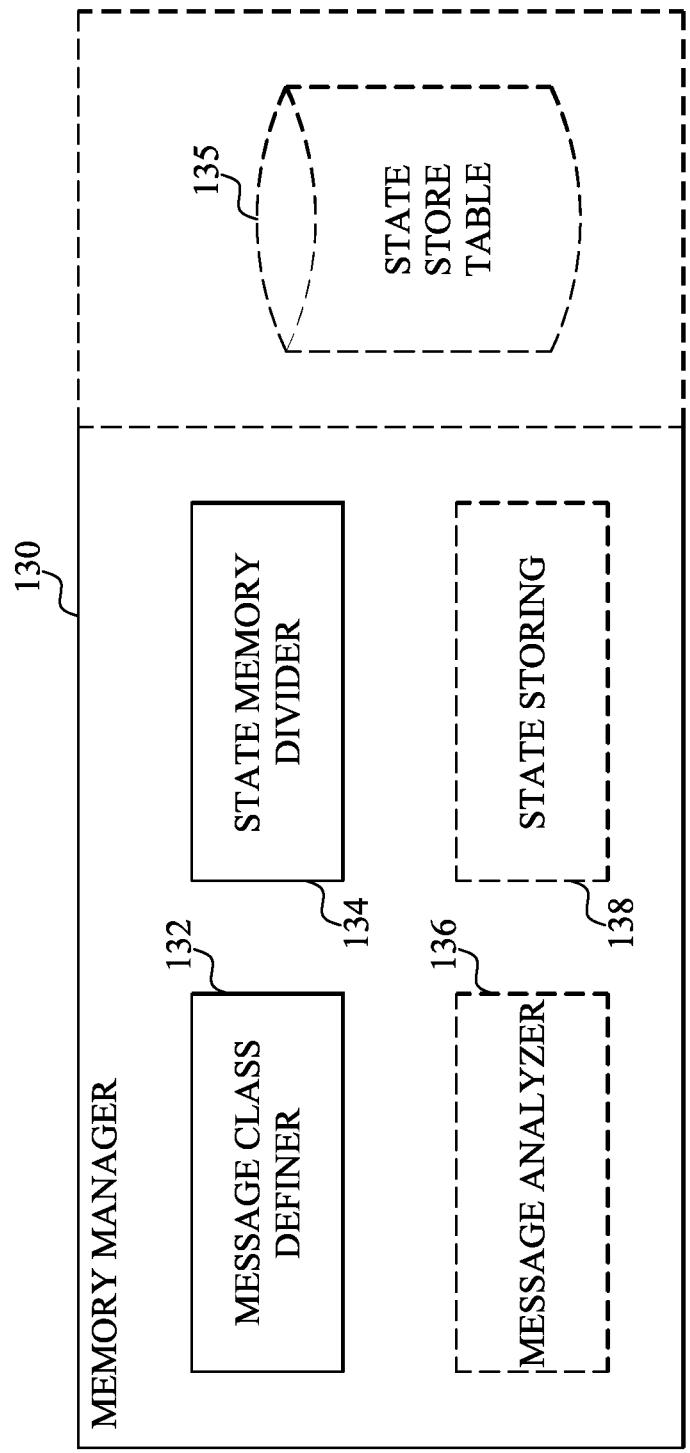
FIG. 5 is a schematic block diagram of an embodiment of a memory manager according to the present invention.

FIG. 5 illustrates a schematic block diagram of a memory manager 130 according to an embodiment of the present invention. In this embodiment, the message class definer 132, the state memory divider 134 and the optional message analyzer 136 and the state storing unit 138 are all implemented in the manager 130. In addition, a state storing table or list 135 is arranged in or otherwise associated with the memory manager 130.

This list can then include state storage priority information used by the message analyzer 136 determining whether to store a given state in the state memory. The operation of the including units 132 to 138 is according to the discussion above in connection with FIGS. 2 to 4.

The units 132, 134, 136 and 138 of the memory manager 120 may be provided as software, hardware or a combination thereof. The units 132 to 138 may be implemented together in the memory manager 130. Alternatively, a distributed implementation is also possible with some of the units provided elsewhere in the communications unit and/or state handler.

Figure 6:
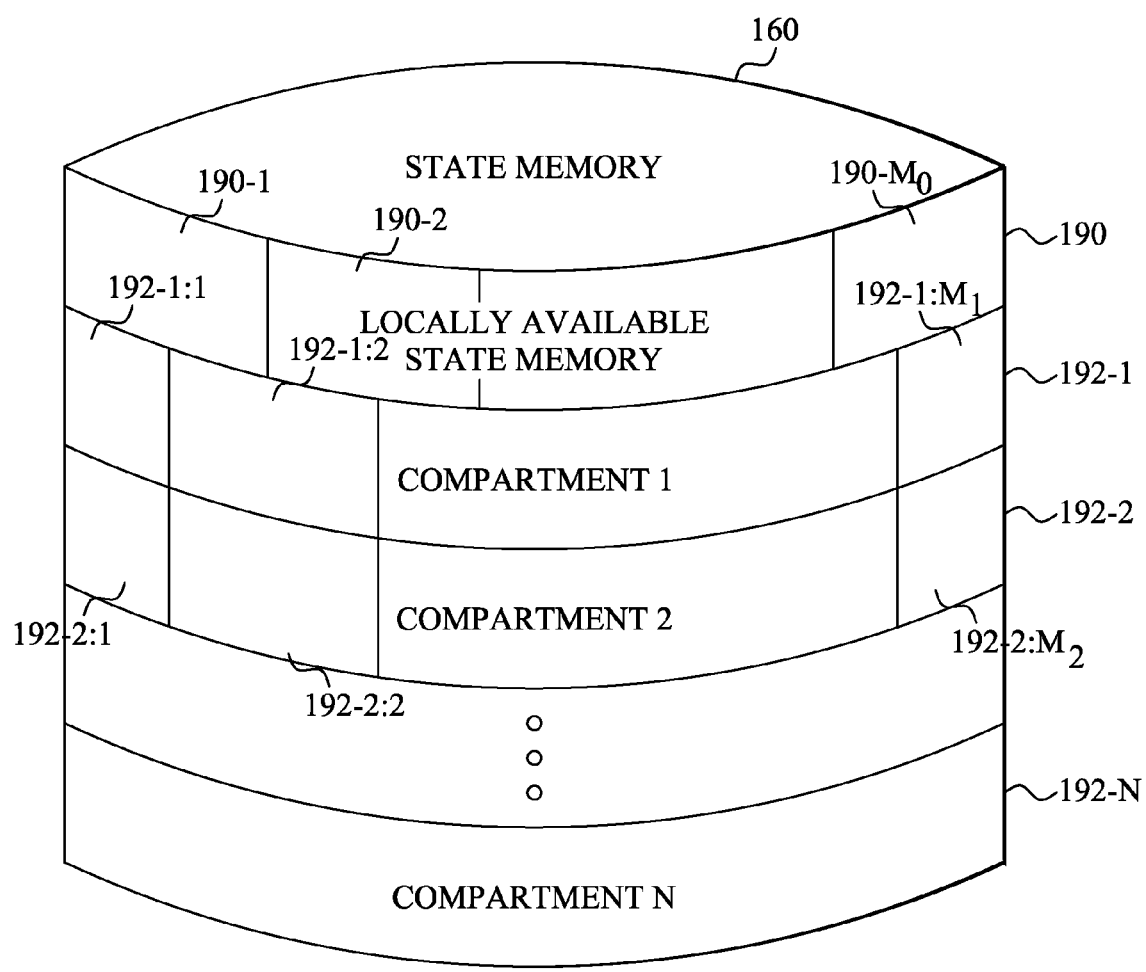
FIG. 6 is a schematic block diagram illustrating an embodiment of a state memory according to the present invention.

FIG. 6 is an illustration of an embodiment of a state memory 160 according to the present invention and applicable to the communications units of FIGS. 2 to 4. The memory 160 is preferably divided (logically or virtually) into multiple memory sections 190; 192-1 to 192-N, where N is an integer equal to or larger than 1. Firstly, the memory 160 preferably comprises a locally available state memory section 190 that mainly comprises states generated by the communications unit itself. In addition, a number of compartments 192-1 to 192-N dedicated to different external communications unit may be found in the state memory 160. The compartments 192-1 to 192-N could be viewed as an application-specific grouping of states that relate to a peer external unit. Thus, each such compartment 192-1 to 192-N preferably includes states used in the communication with a given external unit.

The idea with different dedicated compartments 192-1 to 192-N or sections with states, is to simplify identification of a correct state to use once a message is received from a given external unit or is to be transmitted to the external unit. Other solutions that provide a connection between the state copies and the unit they come from could alternatively be employed. For example, each state could be stored together with an identifier of the external unit from which it originates.

Each such compartment or section 190, 192-1 to 192-N can then be viewed as a state memory according to the present invention. This means that the different sections 190, 192-1 to 192-N are preferably divided into memory portions 190-1 to 190-$M_0$, 192-1:1 to 192-1:$M_1$, 192-2:1 to 192-2:$M_2$, where $M_0$, $M_1$, $M_2$ independently are an integer larger than one. As is schematically illustrated in the figure, the sizes of the different memory portions 190-1 to 190-$M_0$, 192-1:1 to 192-1:$M_1$, 192-2:1 to 192-2:$M_2$ may differ between the different sections or state memories 190, 192-1 to 192-N. In addition, the number of memory portions 190-1 to 190-$M_0$, 192-1:1 to 192-1:$M_1$, 192-2:1 to 192-2:$M_2$ for each respective section 190, 192-1 to 192-N could be the same or differ. It could even be possible that not all compartments 192-N in such a sectioned state memory 160 is divided into memory portions according to the present invention.

Figure 7:
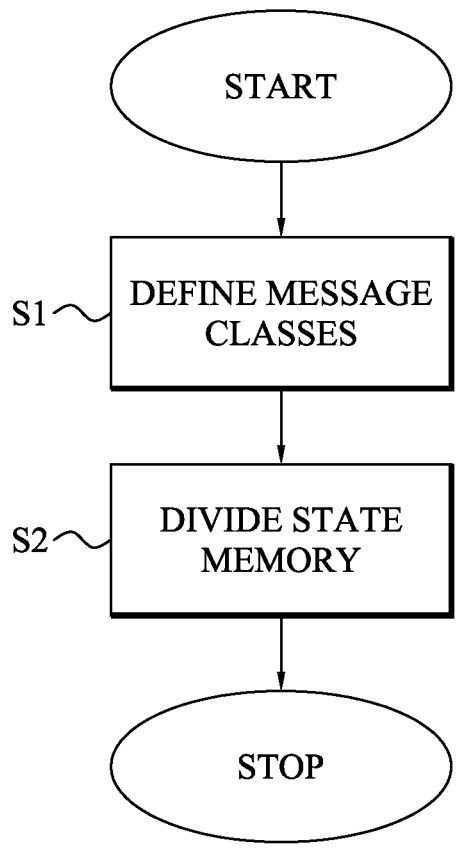
FIG. 7 is a flow diagram illustrating the state memory managing method according to the present invention.

FIG. 7 is a flow diagram illustrating the state memory managing method according to the present invention. The method starts in step S1, where at least two message classes of the messages communicated between communications units are defined. In a next step S2, the state memory, provided in a communications unit and adapted for storing states generated based on the communicated data messages, is divided into at least two memory portions. Each such memory portion is then assigned for storing state information associated with a specific message class. The (virtual) memory division is preferably based on the message class definition so that it is a one-to-one relationship between the defined classes and the memory portions. The method then ends.

Figure 8:
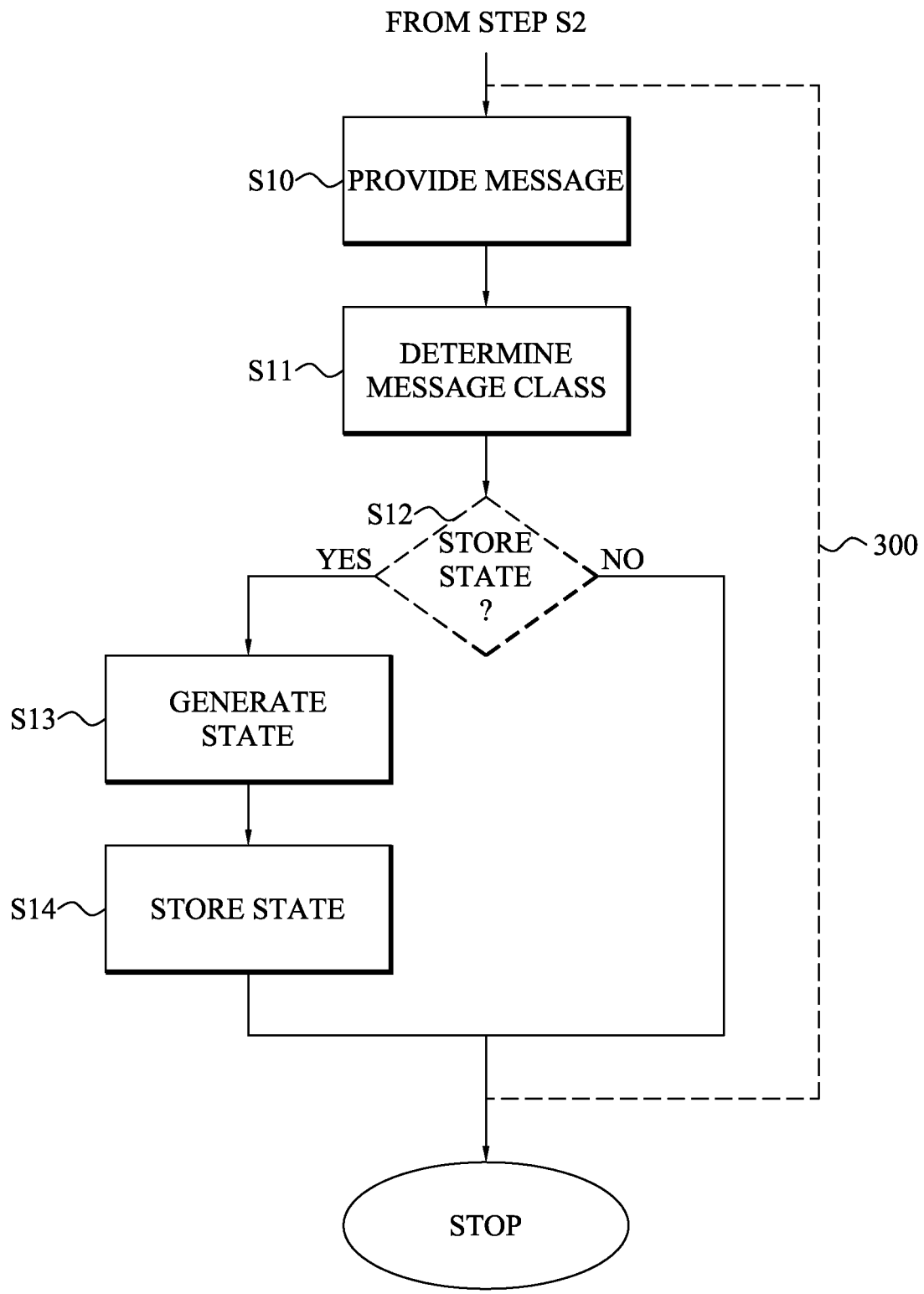
FIG. 8 is a flow diagram illustrating additional steps of the memory managing method of FIG. 7.

FIG. 8 is a flow diagram illustrating additional steps of the state memory managing method of FIG. 7. The method continues from step S2 in FIG. 7. In a next step S10, a data message is provided. This message can be provided from an application generating the message or received from an external communications unit. The message class of this data message is then determined in step S11, preferably based on information found in the message. In the optional step S12, it is investigated whether a state should be generated based on the message and stored in a state memory portion. This determination can be performed based on pre-defined storage priority data, based on an investigation if similar states already are stored in the memory portion and/or based on a compression factor. If it is determined that the state should not be stored in step S12, the method ends or continues to step S10, where a new message is provided. However, if it is determined that state should be generated and stored the method continues to step S13. In this step S13 the state is generated based on the message, unless this procedure has already been performed. The state preferably includes at least a portion of the message, e.g. the whole message. In the next step S14, the state is stored in the memory portion associated with the memory class to which the message, based on which the state was generated, belongs. The steps S10 to S14 are preferably repeated for each provided message, schematically illustrated by the dotted line 300. However, if no new messages are provided the method ends.

Thus, in one aspect of the invention a unit for managing a state memory adapted for storing state information applicable in a message communication between communications units in a communications system is provided. Such unit then includes a class definer that defines at least two message classes of the messages communicated between the communications units. The unit further includes a memory manager that divides the state memory into at least two memory portions, where each memory portion is assigned for storing state information associated messaged classified into a sub-set of the message classes.

It will be understood by a person skilled in the art that various modifications and changes may be made to the present invention without departure from the scope thereof, which is defined by the appended claims.

REFERENCES

[1] PCT/SE2004/000475
[2] Price et al, Network Working Group, Request for Comments: 3320, Category: Standards Track, Signal Compression (SigComp), January 2003
[3] Hannu et al., Network Working Group, Request for Comments: 3321, Category: Informational, Signal Compression (SigComp)—Extended Operations, January 2003
[4] Deutsch et al., Network Working Group, Request for Commments: 1951, Category: Informational, DEFLATE Compressed Data Format Specification version 1.3, May 1996
[5] Storer and Szimanski, Data Compression via Textual Substitution, *Journal of the ACM,* 29:4, 928-951, 1982

The invention claimed is:

1. A method of managing a state memory adapted for storing state information applicable in a message communication between first and second communications units in a communications system, the method comprising the steps of:
    defining at least two message classes of the messages communicated between said first and second communications units; and
    dividing said state memory into at least two memory portions, each memory portion being assigned for storing state information associated with a specific message class;
    analysing a message communicated between said first and second communications units and determining to which message class the message belongs based on the message name;
    wherein said state memory is arranged in the first communication unit and is allocated for storing state information used in message communication with the second communications unit;
    and wherein the method further comprises said second communications unit requesting said first communications unit to allocate state memory space utilized for storing said state information used in said message communication with said second communications unit;
    wherein the defining step comprises defining said at least two message classes based on at least one of:
    a priority type of said communications messages between the first and second communications units;
    an application protocol used when generating said communications messages between the first and second communications units; and
    a session type associated with communications messages between the first and second communications units.

2. The method according to claim 1, wherein said dividing step comprises allocating an equal memory size to said at least two memory portions.

3. The method according to claim 1, wherein said dividing step comprises allocating a first memory size to a first memory portion and a second different memory size to a second memory portion based on a first message class associated with said first memory portion and a second message class associated with said second memory portion.

4. The method according to claim 1, further comprising:
    determining a message class of a communications message; and
    storing state information generated based on said communications message in a memory portion associated with said determined message class.

5. The method according to claim 4, wherein said message class determining step comprises determining said message class based on data found in said communications message.

6. The method according to claim 5, further comprising determining whether said state information is to be stored in said memory portion.

7. The method according to claim 6, wherein said step of determining whether said state information is to be stored comprises retrieving storage priority information from a look-up list comprising storage command information for said message classes.

8. The method according to claim 7, wherein said step of determining whether said state information is to be stored comprises:
    investigating whether similar state information is already stored in said memory portion; and
    storing said state information if no similar state information is already stored in said memory portion.

9. The method according to claim 8, wherein said step of determining whether said state information is to be stored comprises:
    compressing said communications message;
    calculating a compression factor for said communications message; and
    determining whether said state information is to be stored in said memory portion based on said compression factor.

10. A hardware-containing unit for managing a state memory configured for storing state information applicable in a message communication between first and second communications units in a communications system, the unit comprising:
    a message class definer that defines at least two message classes of the messages communicated between said first and second communications units; and
    a state memory divider that divides said state memory into at least two memory portions, each memory portion being assigned for storing state information associated with a specific message class;
    a message analyzer analyzes a message communicated between said first and second communications units and determining to which message class the message belongs based on the message name;
    wherein:
    said message class definer is configured for defining said at least two message classes based on at least one of:

a priority type of said communications messages between said first and second communications units;
an application protocol used when generating said communications messages between said first and second communications units; and
a session type associated with communications messages between said first and second communications units.

11. The hardware-containing unit according to claim 10, wherein said state memory divider is configured for dividing said state memory into at least two memory portions based on said message class definition from said message class definer.

12. The hardware-containing unit according to claim 10, wherein said state information is used during at least one of compression and decompression of said communications messages.

13. The hardware-containing unit according to claim 10, further comprising:
a compressor; and
a decompressor,
wherein at least one of said compressor and said decompressor is arranged to use the state information.

14. The hardware-containing unit according to claim 10, wherein said state memory divider is configured for allocating an equal memory size to said at least two memory portions.

15. The hardware-containing unit according to claim 10, wherein said state memory divider is configured for allocating a first memory size to a first memory portion and a second different memory size to a second memory portion.

16. The hardware-containing unit according to claim 10, further comprising:
a message analyzer that determines a message class of a communications message; and
a state storing unit that stores state information generated based on said communications message in a memory portion associated with said determined message class.

17. The hardware-containing unit according to claim 16, wherein said message analyzer is configured for determining said message class based on data found in said communications message.

18. The hardware-containing unit according to claim 16, wherein said message analyzer is configured to determine whether said state information is to be stored in said memory portion.

19. The hardware-containing unit according to claim 18, wherein said message analyzer is configured for retrieving storage priority information from an associated look-up list comprising storage command information for said message classes and for generating a storing command based on said storage priority information, said state storing unit being responsive to said storing command.

20. The hardware-containing unit according to claim 18, wherein said message analyzer is configured for investigating whether similar state information is already stored in said memory portion and for generating a storing command if no similar state information is already stored in said memory portion, said state storing unit being responsive to said storing command.

21. The hardware-containing unit according to claim 18, wherein said message analyzer is configured for receiving a compression factor obtained during compressing said communications message and for generating a storing command based on said compression factor, said state storing unit being responsive to said storing command.

22. A hardware-containing communications unit configured for message communication with an external communications unit in a communications system, said communications unit comprising:
a state memory configured for storing state information applicable in said message communication between the communications unit and the external communications unit; and
a state memory managing unit that comprises:
a message class definer that defines at least two message classes of the messages communicated between said first and second communications units; and
a state memory divider that divides said state memory into at least two memory portions, each memory portion being assigned for storing state information associated with a specific message class;
a message analyzer analyzes a message communicated between said first and second communications units and determining to which message class the message belongs based on the message name;
wherein:
said message class definer is configured for defining said at least two message classes based on at least one of:
a priority type of said communications messages between said first and second communications units;
an application protocol used when generating said communications messages between said first and second communications units; and
a session type associated with communications messages between said first and second communications units; and
wherein the state memory managing unit is operable to define message classes of messages communicated between the communications unit and the external communications unit.

23. A method of managing a state memory configured for storing state information applicable in a message communication between hardware-containing communications units in a communications system, the method implemented by one of the hardware-containing communications units comprising the steps of:
obtaining a plurality of messages to be transmitted over a radio link;
generating state information based on a first message of the plurality of messages;
if the first message comprises information relating to session setup, storing the generated state information in a first portion of the state memory;
if the first message comprises presence information, storing the generated state information in a second portion of the state memory different from the first portion, such that state information generated based on messages comprising presence information is prevented from overwriting state information generated based on messages comprising information relating to session setup;
compressing a second message of the plurality of messages based on state information stored in the state memory and associated with the second message; and
transmitting the compressed second message over the radio link.

24. A hardware-containing apparatus for communicating messages over a radio link, comprising:
a state memory operable to store state information, the state memory comprising:
a first portion associate with a first class of messages; and a second portion associated with a second class of messages;

a state handler operable to:
  generate state information based on a first message of a plurality of messages to be transmitted over a wireless link;
  if the first message comprises information relating to session setup, store the generated state information in a first portion of the state memory;
  if the first message comprises presence information, store the generated state information in a second portion of the state memory different from the first portion, such that state information generated based on messages comprising presence information is prevented from overwriting state information generated based on messages comprising information relating to session setup;

a processor operable to compress a second message of the plurality of messages based on state information stored in the state memory and associated with the second message; and an input/output (I/O) unit operable to transmit the compressed second message over the radio link.

* * * * *

UNITED STATES PATENT AND TRADEMARK OFFICE
CERTIFICATE OF CORRECTION

| | |
|---|---|
| PATENT NO. | : 9,092,319 B2 |
| APPLICATION NO. | : 14/090775 |
| DATED | : July 28, 2015 |
| INVENTOR(S) | : Christoffersson et al. |

It is certified that error appears in the above-identified patent and that said Letters Patent is hereby corrected as shown below:

Title Page, Item (54), in Title, in Column 1, Line 4, delete "PORTIONS" and insert -- PORTIONS, --, therefor.

In the Specification

In Column 1, Line 4, delete "PORTIONS" and insert -- PORTIONS, --, therefor.

In Column 6, Line 44, delete "application 150" and insert -- application 140 --, therefor.

In Column 11, Lines 54-55, delete "memory manager 120" and insert -- memory manager 130 --, therefor.

Signed and Sealed this
Twenty-first Day of June, 2016

Michelle K. Lee
*Director of the United States Patent and Trademark Office*